(12) United States Patent
Ly et al.

(10) Patent No.: US 10,673,552 B2
(45) Date of Patent: Jun. 2, 2020

(54) SYNCHRONIZATION SIGNAL BLOCK DESIGNS FOR WIRELESS COMMUNICATION

(71) Applicant: QUALCOMM Incorporated, San Diego, CA (US)

(72) Inventors: Hung Ly, San Diego, CA (US); Navid Abedini, Raritan, NJ (US); Tao Luo, San Diego, CA (US); Tingfang Ji, San Diego, CA (US); Heechoon Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 11 days.

(21) Appl. No.: 15/936,200

(22) Filed: Mar. 26, 2018

(65) Prior Publication Data

US 2018/0302182 A1 Oct. 18, 2018

Related U.S. Application Data

(60) Provisional application No. 62/485,822, filed on Apr. 14, 2017.

(51) Int. Cl.
*H04J 3/06* (2006.01)
*H04J 11/00* (2006.01)
(Continued)

(52) U.S. Cl.
CPC ....... *H04J 11/0073* (2013.01); *H04J 11/0076* (2013.01); *H04L 5/0023* (2013.01);
(Continued)

(58) Field of Classification Search
USPC .......................................... 370/328, 331, 350
See application file for complete search history.

(56) References Cited

U.S. PATENT DOCUMENTS

2014/0128085 A1* 5/2014 Charbit ..................... H04L 5/00
455/450
2015/0049741 A1 2/2015 Chen et al.
(Continued)

FOREIGN PATENT DOCUMENTS

CN 104104636 B 8/2017
WO 2015080649 A1 6/2015
(Continued)

OTHER PUBLICATIONS

International Search Report and Written Opinion—PCT/US2018/024647—ISA/EPO—dated Jun. 15, 2018.
(Continued)

*Primary Examiner* — Phuongchau Ba Nguyen
(74) *Attorney, Agent, or Firm* — Loza & Loza, LLP

(57) ABSTRACT

Aspects of the present disclosure provide various synchronization signal (SS) block designs that can facilitate channel estimation and demodulation in 5G New Radio (NR) networks. An exemplary SS block includes a set of time-frequency resources that are allocated to carry a Primary Synchronization Signal (PSS), a Secondary Synchronization Signal (SSS) and a Physical Broadcast Channel (PBCH) that are time and/or frequency multiplexed within the SS block. In some examples, unused time-frequency resources of the SS block may be used or allocated for supplemental channels that can improve and/or extend wireless link coverage.

46 Claims, 14 Drawing Sheets

(51) Int. Cl.
*H04L 25/02* (2006.01)
*H04L 5/00* (2006.01)
*H04L 27/26* (2006.01)

(52) U.S. Cl.
CPC ........ *H04L 5/0051* (2013.01); *H04L 25/0204* (2013.01); *H04L 27/2613* (2013.01); *H04L 27/2692* (2013.01); *H04L 5/0053* (2013.01); *H04L 5/0064* (2013.01)

(56) References Cited

U.S. PATENT DOCUMENTS

| | | | |
|---|---|---|---|
| 2017/0064685 A1 | 3/2017 | Rico et al. | |
| 2017/0094621 A1 | 3/2017 | Xu et al. | |
| 2018/0084593 A1* | 3/2018 | Chen | H04W 76/11 |
| 2018/0302182 A1* | 10/2018 | Ly | H04L 5/0023 |
| 2019/0150068 A1* | 5/2019 | Montojo | H04W 28/26 370/329 |

FOREIGN PATENT DOCUMENTS

| | | | | |
|---|---|---|---|---|
| WO | WO-2017062061 A1 | | 4/2017 | |
| WO | WO-2017131806 A1 | | 8/2017 | |
| WO | WO 2018/137641 | * | 8/2018 | ............... H04L 1/00 |

OTHER PUBLICATIONS

Nokia et al., "SS Bandwidth, Numerology and Multiplexing", 3GPP Draft; R1-1703090, 3rd Generation Partnership Project (3GPP), Mobile Competence Centre; 650, Route Des Lucioles; F-06921 Sophia-Antipolis Cedex; ; France; vol. RAN WG1, No. Athens, Greece; Feb. 13, 2017-Feb. 17, 2017 Feb. 12, 2017, XP051210228, Retrieved from the Internet: URL:http://www.3gpp.org/ftp/Meetings_3GPP_SYNC/RAN1/Docs/ [retrieved on Feb. 12, 2011], 6 pages.

Samsung: "SS Bandwidth and Multiplexing in SS Block", 3GPP Draft; R1-1702900 SS Bandwidth and Multiplexing in SS Block, 3rd Generation Partnership Project (3GPP), Mobile Competence Centre; 650, Route Des Lucioles; F-06921 Sophia-Antipolis Cedex; France; vol. RAN WG1, No. Athens, Greece; Feb. 13, 2017-Feb. 17, 2017 Feb. 12, 2017, XP05120044, Retrieved from the Internet: URL:http://www.3gpp.org/ftp/Meetings_3GPP_SYNC/RAN1/Docs/ [retrieved on Feb. 12, 2017], 6 pages.

Samsung: "SS BW and Multiplexing", 3GPP Draft; R1-1700884, 3rd Generation Partnership Project (3GPP), Mobile Competence Centre; 650, Route Des Lucioles; F-06921 Sophia-Antipolis Cedex; France; vol. RAN WG1, No. Spokane, USA; Jan. 16, 2017-Jan. 20, 2017 Jan. 16, 2017, XP051208400, Retrieved from the Internet: URL:http://www.3gpp.org/ftp/Meetings_3GPP_SYNC/RAN1/Docs/ [retrieved on Jan. 16, 2017], 8 pages.

* cited by examiner

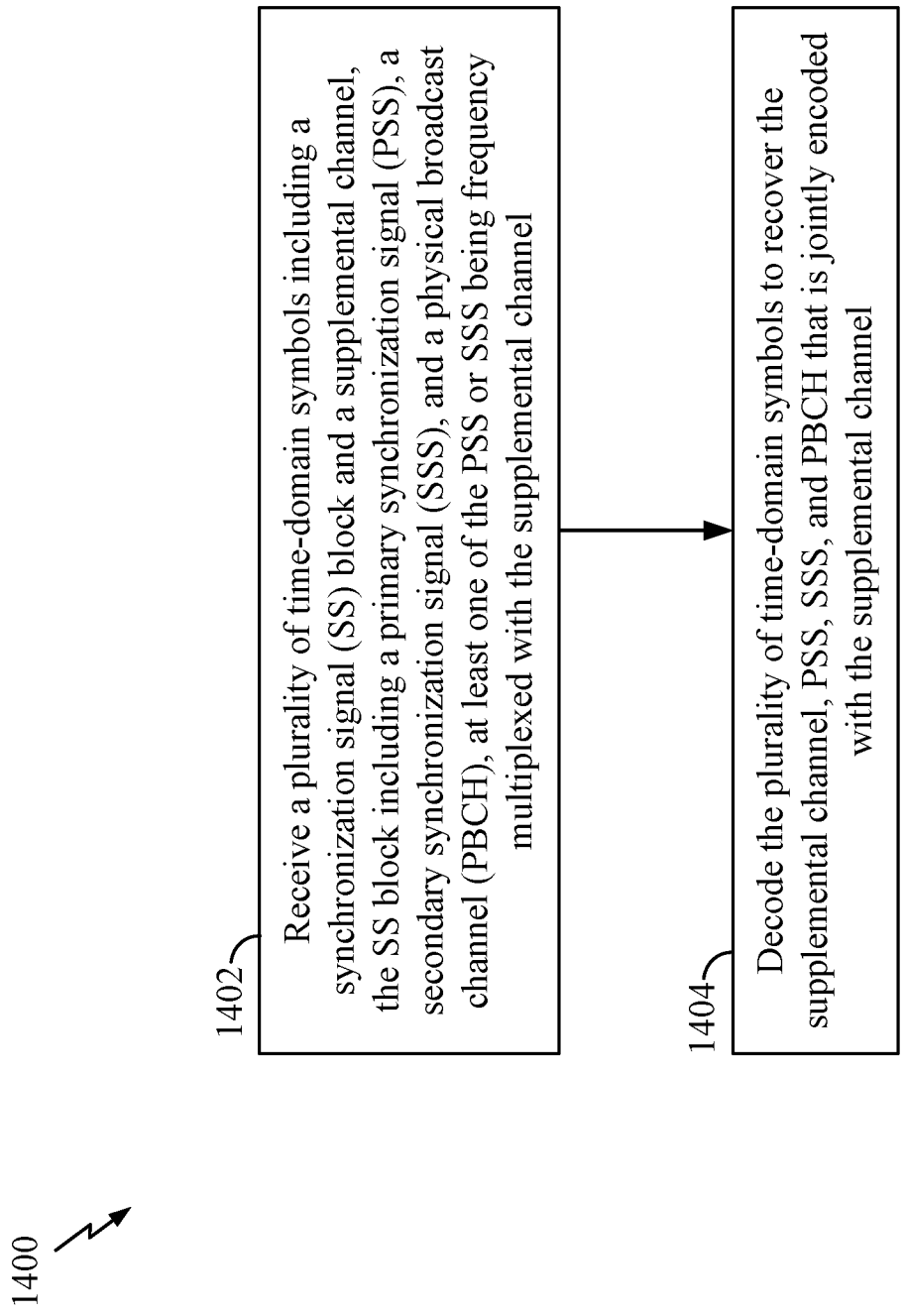

SYNCHRONIZATION SIGNAL BLOCK DESIGNS FOR WIRELESS COMMUNICATION

PRIORITY CLAIM

This application claims priority to and the benefit of U.S. provisional patent application No. 62/485,822 filed in the United States Patent and Trademark Office on Apr. 14, 2017, the entire content of which is incorporated herein by reference as if fully set forth below in its entirety and for all applicable purposes.

TECHNICAL FIELD

The technology discussed below relates generally to wireless communication systems, and more particularly, to synchronization signal designs and related methods for wireless communication.

INTRODUCTION

Next-generation wireless networks like 5G New Radio (NR) can support an increased number of services and devices including, for example, smartphones, mobile devices, Internet of Things (IoT) devices, sensor networks, and many more. As compared to current networks, 5G NR can provide greater performance like higher bit rates, mobility at higher speed, and/or lower latency in various applications. In addition, 5G NR networks can have higher connection density, new spectrum allocation, and utilize unlicensed and licensed bands. In 5G NR, synchronization requirements may be based on the services provided and the network infrastructure. For example, device-to-device (D2D), peer-to-peer (P2P), vehicle-to-vehicle (V2V), and IoT communications require accurate synchronization. Moreover, next-generation networks may introduce new air interfaces and capabilities related to time-sensitive networks that may need synchronization support from the network. Therefore, synchronization signal designs and related features are important in 5G NR network design.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Aspects of the present disclosure provide various synchronization signal (SS) block designs that can facilitate channel estimation and demodulation in 5G New Radio (NR) networks. An exemplary SS block includes a set of time-frequency resources that are allocated to carry a Primary Synchronization Signal (PSS), a Secondary Synchronization Signal (SSS) and a Physical Broadcast Channel (PBCH) that are time and/or frequency multiplexed within the SS block. In some examples, unused time-frequency resources of the SS block may be used or allocated for supplemental channels that can improve and/or extend wireless link coverage.

One aspect of the present disclosure provides a method of wireless communication operable at a scheduling entity. The scheduling entity schedules a plurality of time-domain symbols for transmitting a synchronization signal (SS) block and a supplemental channel. The SS block includes a primary synchronization signal (PSS), a secondary synchronization signal (SSS), and a physical broadcast channel (PBCH). The scheduling entity jointly encodes the PBCH and the supplemental channel for transmission. The scheduling entity transmits the plurality of time-domain symbols including the SS block and the supplemental channel to a user equipment (UE). At least one of the PSS or SSS is frequency multiplexed with the supplemental channel.

Another aspect of the present disclosure provides a method of wireless communication operable at a user equipment (UE). The UE receives a plurality of time-domain symbols including a synchronization signal (SS) block and a supplemental channel. The SS block includes a primary synchronization signal (PSS), a secondary synchronization signal (SSS), and a physical broadcast channel (PBCH), at least one of the PSS or SSS being frequency multiplexed with the supplemental channel. The UE decodes the plurality of time-domain symbols to recover the supplemental channel, PSS, SSS, and PBCH that is jointly encoded with the supplemental channel.

Another aspect of the present disclosure provides a scheduling entity for wireless communication. The scheduling entity includes a communication interface, a memory, and a processor operatively coupled with the communication interface and the memory. The processor and the memory are configured to schedule a plurality of time-domain symbols for transmitting a synchronization signal (SS) block and a supplemental channel, the SS block comprising a primary synchronization signal (PSS), a secondary synchronization signal (SSS), and a physical broadcast channel (PBCH). The processor and the memory are configured to jointly encode the PBCH and the supplemental channel for transmission. The processor and the memory are configured to transmit the plurality of time-domain symbols including the SS block and the supplemental channel to a user equipment (UE), and at least one of the PSS or SSS is frequency multiplexed with the supplemental channel.

Another aspect of the present disclosure provides a user equipment (UE) for wireless communication. The UE includes a communication interface, a memory, and a processor operatively coupled with the communication interface and the memory. The processor and the memory are configured to receive a plurality of time-domain symbols including a synchronization signal (SS) block and a supplemental channel. The SS block includes a primary synchronization signal (PSS), a secondary synchronization signal (SSS), and a physical broadcast channel (PBCH). At least one of the PSS or SSS is frequency multiplexed with the supplemental channel. The processor and the memory are configured to decode the plurality of time-domain symbols to recover the supplemental channel, PSS, SSS, and PBCH that is jointly encoded with the supplemental channel.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments, it should be understood that such exemplary embodiments can be implemented in various devices, systems, and methods.

BRIEF DESCRIPTION OF THE DRAWINGS

FIG. 14 is a flow chart illustrating another exemplary process for wireless communication using an SS block according to some aspects of the present disclosure.

DETAILED DESCRIPTION

Figure 1:
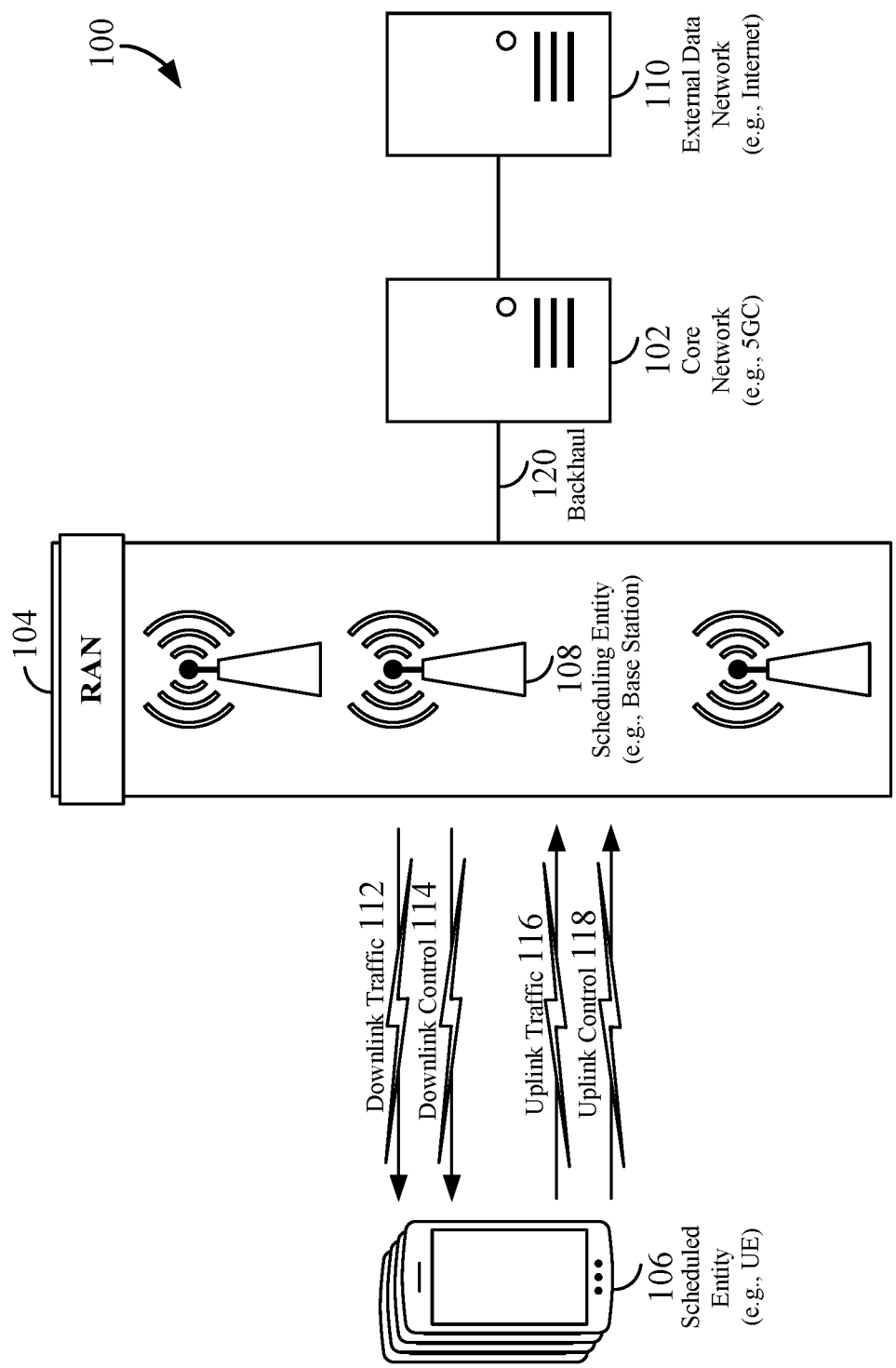
FIG. 1 is a schematic illustration of a wireless communication system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily include a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

Aspects of the present disclosure provide various synchronization signal (SS) block designs that can facilitate channel estimation and demodulation in 5G New Radio (NR) networks. An exemplary SS block includes a set of time-frequency resources that are allocated to carry a Primary Synchronization Signal (PSS), a Secondary Synchronization Signal (SSS) and a Physical Broadcast Channel (PBCH) that are time and/or frequency multiplexed within the SS block. In some examples, unused time-frequency resources of the SS block may be used or allocated for supplemental channels that can improve and/or extend wireless link coverage.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to $3^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smartphone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multicopter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
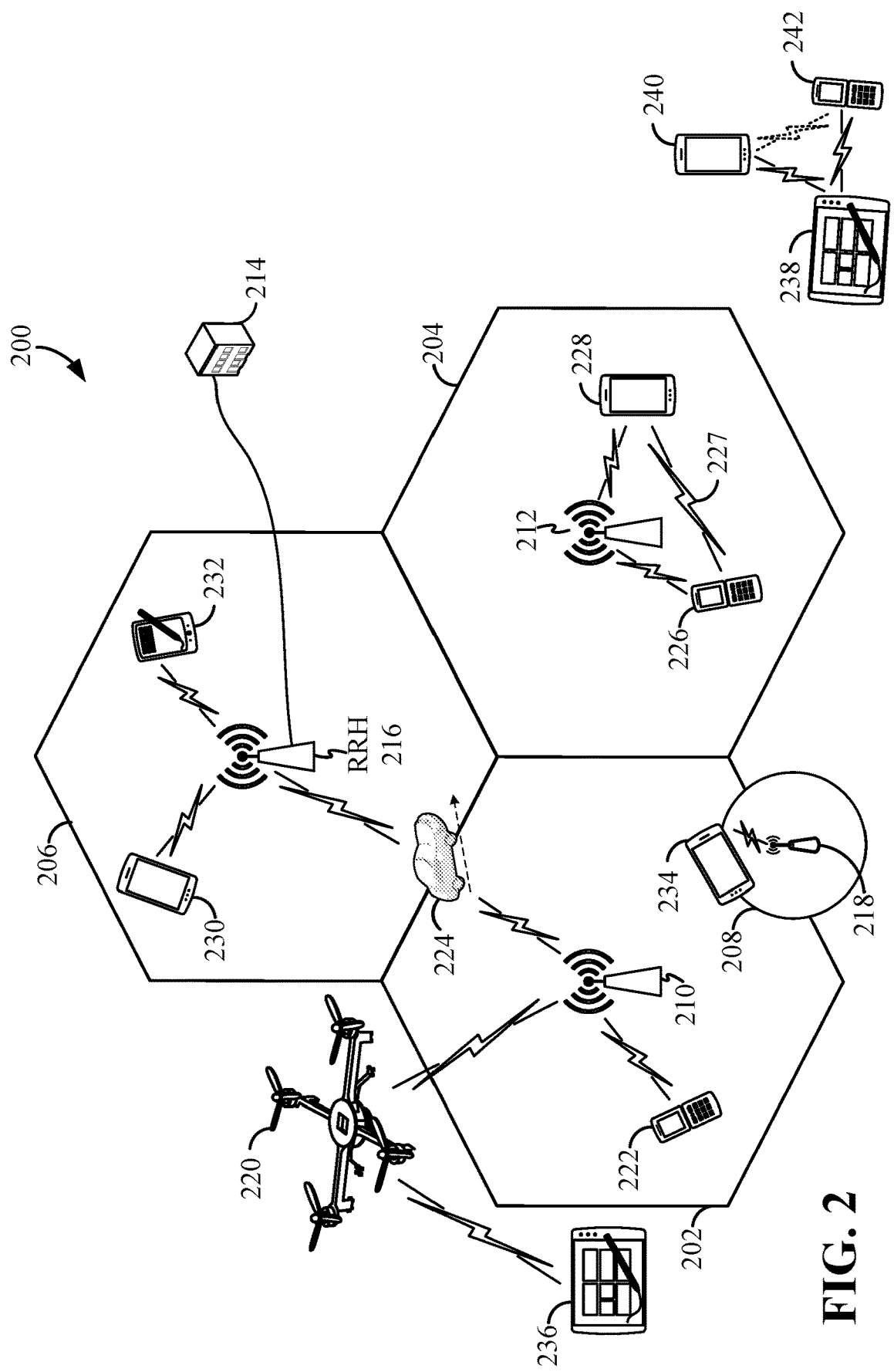
FIG. 2 is a conceptual illustration of an example of a radio access network.

FIG. 2 is a conceptual illustration of an example of a radio access network. By way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 126 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes a quadcopter or drone 220, which may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1.

In some examples, a mobile network node (e.g., quadcopter 220) may be configured to function as a UE. For example, the quadcopter 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the scheduling entity 238. Thus, in a wireless communication system with scheduled access to time-frequency resources and having a cellular configuration, a P2P configuration, or a mesh configuration, a scheduling entity and one or more scheduled entities may communicate utilizing the scheduled resources.

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

In various aspects of the disclosure, a radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

Figure 3:
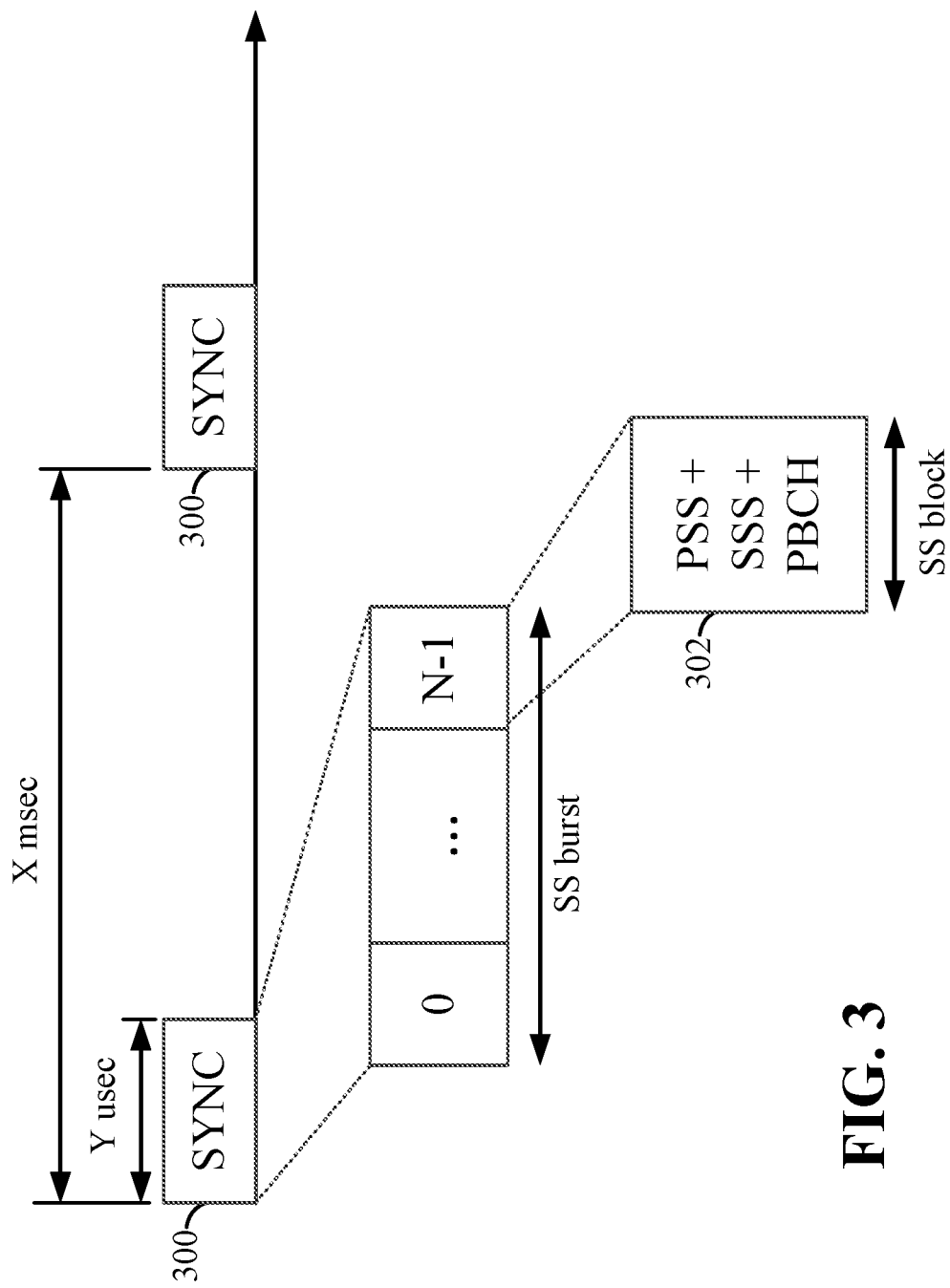
FIG. 3 is a diagram illustrating a synchronization signal (SS) burst containing multiple SS blocks according to some aspects of the disclosure.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). In some embodiments, the PSS, SSS, and PBCH may be included in a self-contained synchronization signal (SS) block. In some examples, the network may transmit periodically an SS burst containing multiple SS blocks. Two exemplary SS bursts 300 are illustrated in FIG. 3, although an SS burst set may include any suitable number of SS bursts. In some examples, an SS burst set may include periodic transmissions of the SS bursts 300, for example, every X milliseconds (msec), although any periodicity of SS bursts, or an aperiodic set of SS bursts may also be utilized. Each SS burst 300 may include a predetermined number of SS blocks 302 (N SS blocks are illustrated in FIG. 3). Each SS block 302 may include the PSS, SSS, and PBCH multiplexed in time and/or frequency.

Referring back to FIG. 2, the UEs 222, 224, 226, 228, 230, and 232 may receive the SS block 302 containing the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signals (e.g., SS blocks 302) transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

In order for transmissions over the radio access network 200 to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

However, those of ordinary skill in the art will understand that aspects of the present disclosure may be implemented utilizing any suitable channel code. Various implementations of scheduling entities 108 and scheduled entities 106 may include suitable hardware and capabilities (e.g., an encoder, a decoder, and/or a CODEC) to utilize one or more of these channel codes for wireless communication.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Various aspects of the present disclosure will be described with reference to an OFDM waveform, schematically illustrated in FIG. 4. It should be understood by those of ordinary skill in the art that the various aspects of the present disclosure may be applied to a DFT-s-OFDMA waveform in substantially the same way as described herein below. That is, while some examples of the present disclosure may focus on an OFDM link for clarity, it should be understood that the same principles may be applied as well to DFT-s-OFDMA waveforms.

Within the present disclosure, a frame refers to a predetermined duration (e.g., 10 ms) for wireless transmissions, with each frame consisting of, for example, 10 subframes of 1 ms each. On a given carrier, there may be one set of frames in the uplink (UL), and another set of frames in the downlink (DL). Referring now to FIG. 4, an expanded view of an exemplary DL subframe 402 is illustrated, showing an OFDM resource grid 404. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers or tones.

The resource grid 404 may be used to schematically represent time-frequency resources for a given antenna port. That is, in a MIMO implementation with multiple antenna ports available, a corresponding multiple numbers of resource grids 404 may be available for communication. The resource grid 404 is divided into multiple resource elements (REs) 406. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 408, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 408 entirely corresponds to a single direction of communication (either transmission or reception for a given device).

A UE generally utilizes only a subset of the resource grid 404. An RB may be the smallest unit of resources that can be allocated to a UE. Thus, the more RBs scheduled for a UE, and the higher the modulation scheme chosen for the air interface, the higher the data rate for the UE.

In this illustration, the RB 408 is shown as occupying less than the entire bandwidth of the subframe 402, with some subcarriers illustrated above and below the RB 408. In a given implementation, the subframe 402 may have a bandwidth corresponding to any number of one or more RBs 408. Further, in this illustration, the RB 408 is shown as occupying less than the entire duration of the subframe 402, although this is merely one possible example.

Each subframe (e.g., 1 ms subframe 402) may consist of one or multiple adjacent slots. In the example shown in FIG. 4, one subframe 402 includes four slots 410, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., one or two OFDM symbols). These mini-slots may in some cases be transmitted occupying resources scheduled for ongoing slot transmissions for the same or for different UEs.

An expanded view of one of the slots 410 illustrates the slot 410 including a control region 412 and a data region 414. In general, the control region 412 may carry control channels (e.g., PDCCH), and the data region 414 may carry data channels (e.g., PDSCH or PUSCH). Of course, a slot may contain all DL, all UL, or at least one DL portion and at least one UL portion. The simple structure illustrated in FIG. 4 is merely exemplary in nature, and different slot structures may be utilized, and may include one or more of each of the control region(s) and data region(s).

Figure 4:
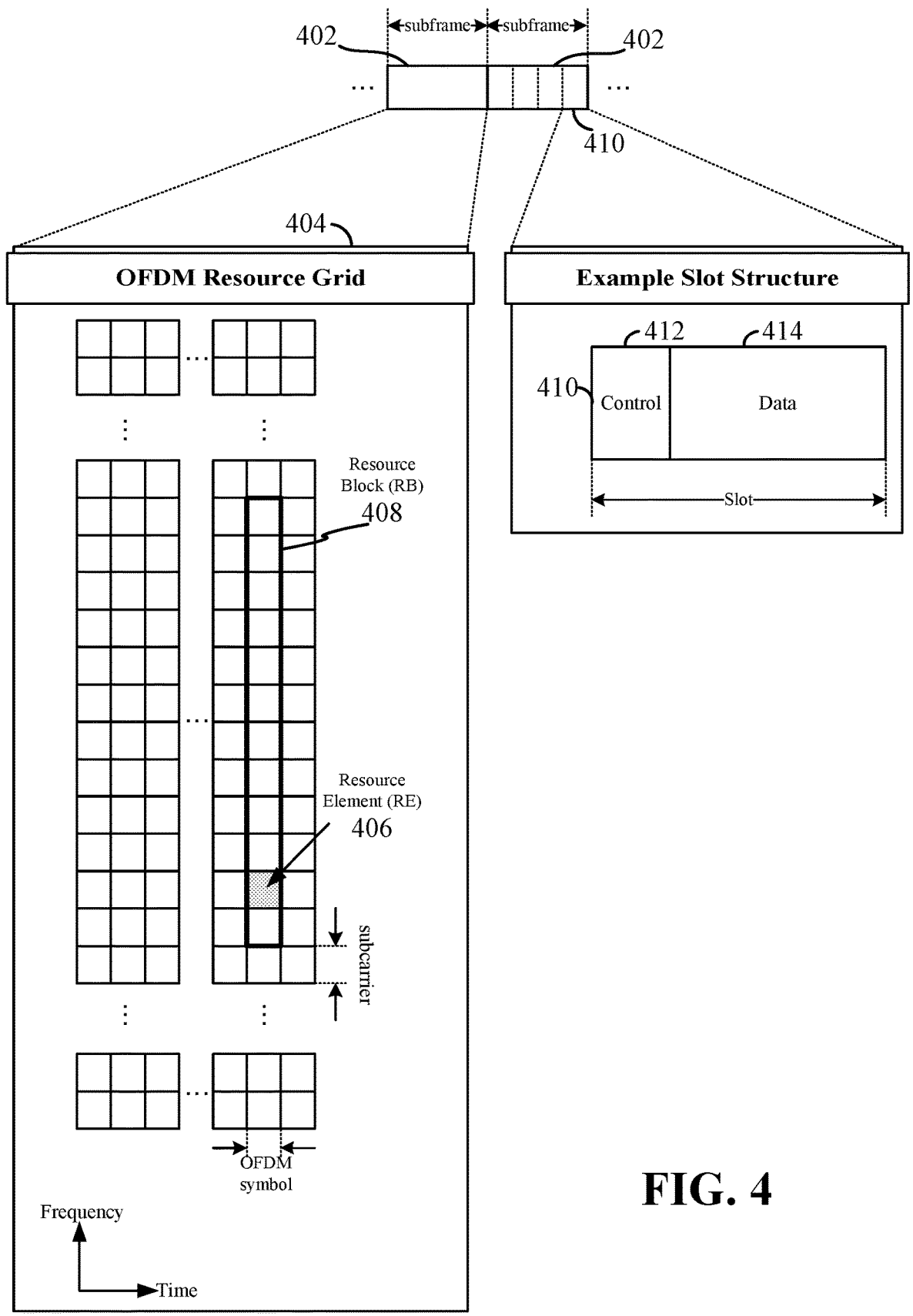
FIG. 4 is a schematic illustration of an organization of wireless resources in an air interface utilizing orthogonal frequency divisional multiplexing (OFDM).

Although not illustrated in FIG. 4, the various REs 406 within an RB 408 may be scheduled to carry one or more physical channels, including control channels, shared channels, data channels, etc. Other REs 406 within the RB 408 may also carry pilots, or reference signals, including but not limited to a demodulation reference signal (DMRS) a control reference signal (CRS), or a sounding reference signal (SRS). These pilots or reference signals may provide for a receiving device to perform channel estimation of the corresponding channel, which may enable coherent demodulation/detection of the control and/or data channels within the RB 408.

In a DL transmission, the transmitting device (e.g., the scheduling entity 108) may allocate one or more REs 406 (e.g., within a control region 412) to carry DL control information 114 including one or more DL control channels such as a PBCH, a PSS, an SSS, an SS block, a physical control format indicator channel (PCFICH), a physical hybrid automatic repeat request (HARQ) indicator channel (PHICH), and/or a physical downlink control channel (PDCCH), etc., to one or more scheduled entities 106. The PCFICH provides information to assist a receiving device in receiving and decoding the PDCCH. The PDCCH carries downlink control information (DCI) including but not limited to power control commands, scheduling information, a grant, and/or an assignment of REs for DL and UL transmissions. The PHICH carries HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

In an UL transmission, the transmitting device (e.g., the scheduled entity 106) may utilize one or more REs 406 to carry UL control information 118 including one or more UL control channels, such as a physical uplink control channel (PUCCH), to the scheduling entity 108. UL control information may include a variety of packet types and categories, including pilots, reference signals, and information configured to enable or assist in decoding uplink data transmissions. In some examples, the control information 118 may include a scheduling request (SR), e.g., a request for the scheduling entity 108 to schedule uplink transmissions. Here, in response to the SR transmitted on the control channel 118, the scheduling entity 108 may transmit downlink control information 114 that may schedule resources for uplink packet transmissions. UL control information may also include HARQ feedback, channel state feedback (CSF), or any other suitable UL control information.

In addition to control information, one or more REs 406 (e.g., within the data region 414) may be allocated for user data or traffic data. Such traffic may be carried on one or more traffic channels, such as, for a DL transmission, a physical downlink shared channel (PDSCH); or for an UL transmission, a physical uplink shared channel (PUSCH). In some examples, one or more REs 406 within the data region 414 may be configured to carry system information blocks (SIB s), carrying information that may enable access to a given cell.

The channels or carriers described above and illustrated in FIGS. 1 and 4 are not necessarily all the channels or carriers that may be utilized between a scheduling entity 108 and scheduled entities 106, and those of ordinary skill in the art will recognize that other channels or carriers may be utilized in addition to those illustrated, such as other traffic, control, and feedback channels.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

In OFDM, to maintain orthogonality of the subcarriers or tones, the subcarrier spacing may be equal to the inverse of the symbol period. A numerology of an OFDM waveform refers to its particular subcarrier spacing and cyclic prefix (CP) overhead. A scalable numerology refers to the capability of the network to select different subcarrier spacings, and accordingly, with each spacing, to select the corresponding symbol duration, including the CP length. With a scalable numerology, a nominal subcarrier spacing (SCS) may be scaled upward or downward by integer multiples. In this manner, regardless of CP overhead and the selected SCS, symbol boundaries may be aligned at certain common multiples of symbols (e.g., aligned at the boundaries of each 1 ms subframe). The range of SCS may include any suitable SCS. For example, a scalable numerology may support an SCS ranging from 15 kHz to 480 kHz.

Figure 5:
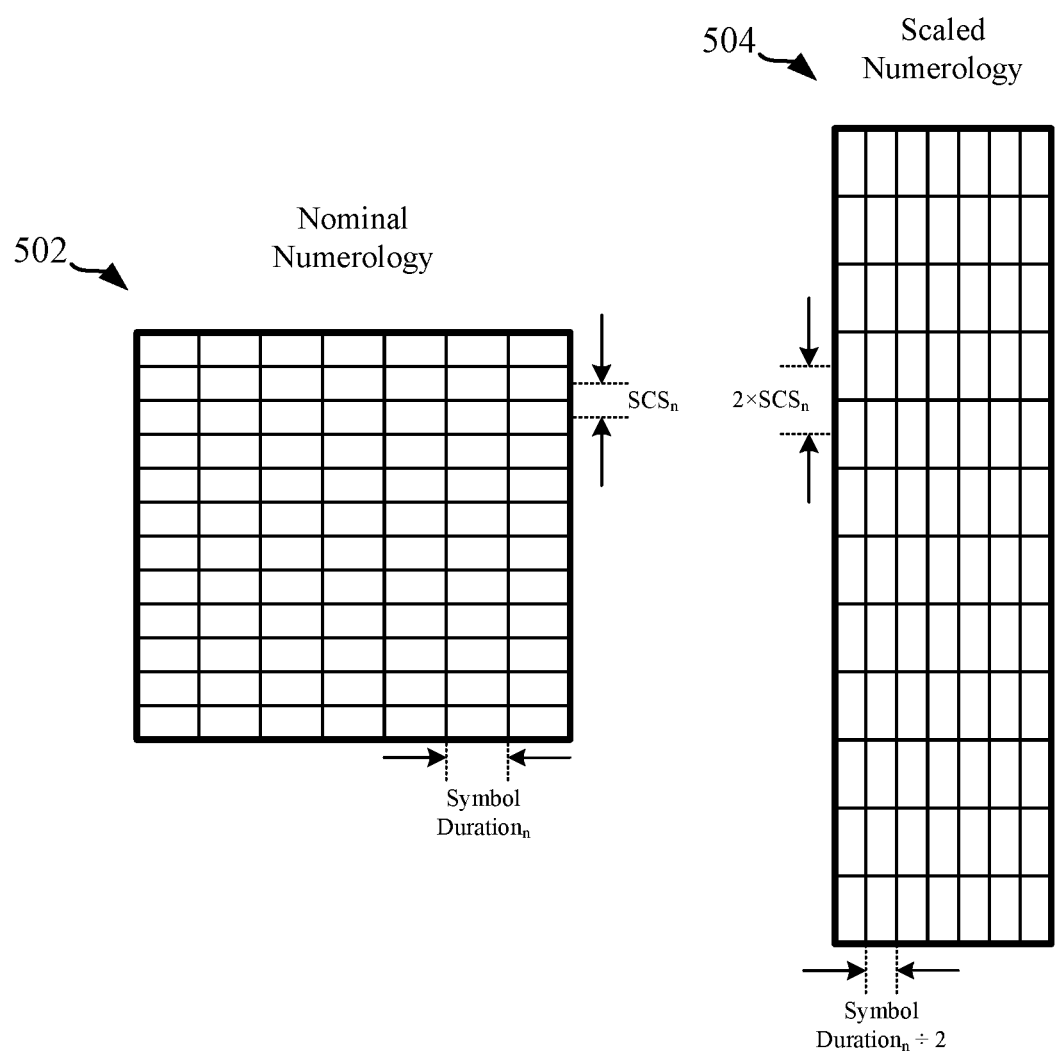
FIG. 5 is a schematic illustration of an OFDM air interface utilizing a scalable numerology according to some aspects of the disclosure.

To illustrate this concept of a scalable numerology, FIG. 5 shows a first RB 502 having a nominal numerology, and a second RB 504 having a scaled numerology. As one example, the first RB 502 may have a 'nominal' subcarrier spacing ($SCS_n$) of 30 kHz, and a 'nominal' symbol $duration_n$ of 333 µs. Here, in the second RB 504, the scaled numerology includes a scaled SCS of double the nominal SCS, or $2 \times SCS_n = 60$ kHz. Because this provides twice the bandwidth per symbol, it results in a shortened symbol duration to carry the same information. Thus, in the second RB 504, the scaled numerology includes a scaled symbol duration of half the nominal symbol duration, or (symbol $duration_n$)÷2=167 µs.

Figure 6:
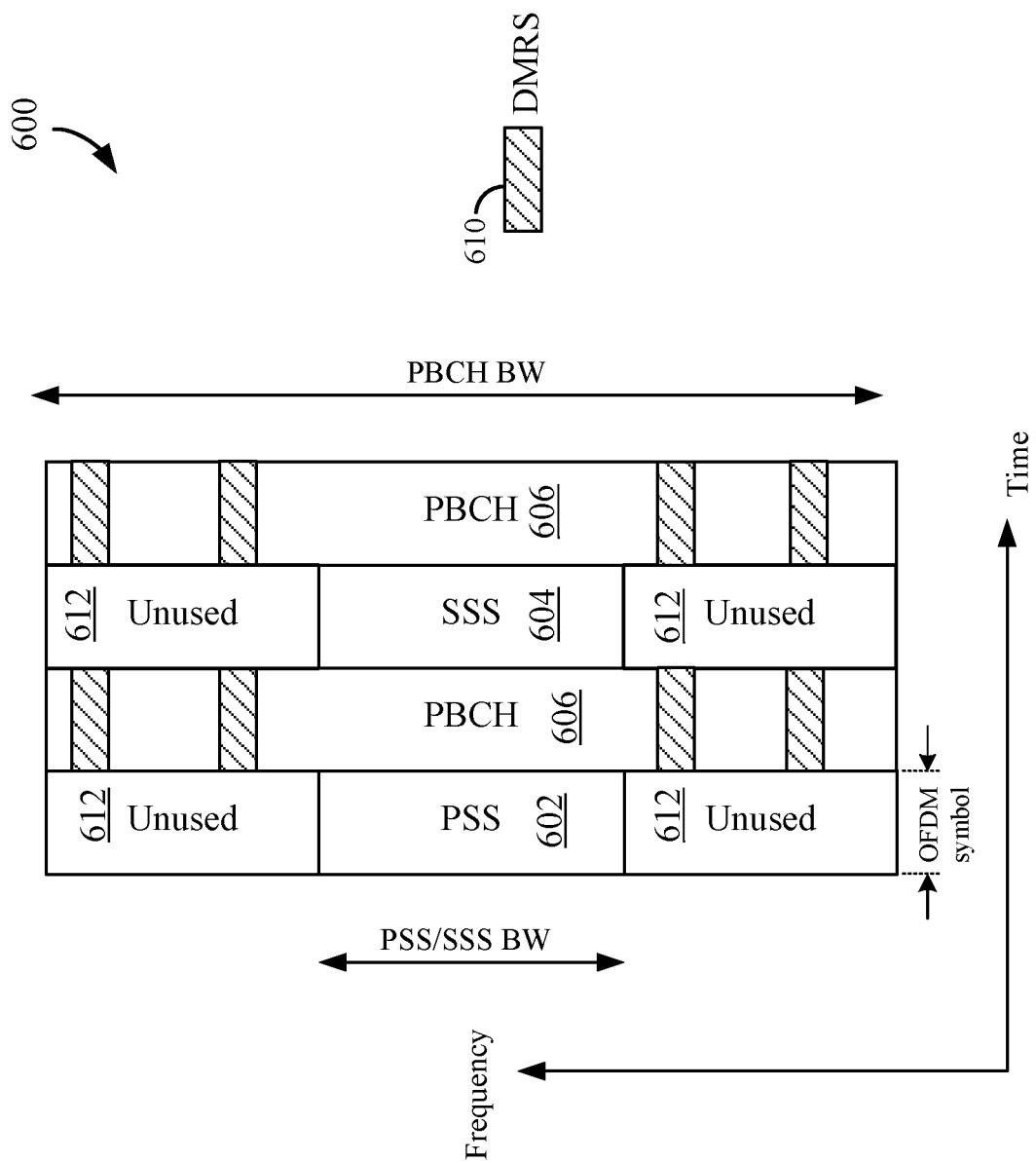
FIG. 6 is a diagram illustrating a synchronization signal (SS) block design according to some aspects of the disclosure.

In some aspects of the disclosure, a scheduling entity 108 (e.g., gNB) may transmit synchronization and control signals (e.g., PSS, SSS, and PBCH) to one or more scheduled entities 108 (e.g., UE) using various SS block designs. Each SS block may include a PSS, SSS, and PBCH. FIG. 6 is a diagram illustrating an exemplary SS block 600 according to some aspects of the disclosure. The SS block 600 may be the same as the SS block 302 of FIG. 3 and may be included in the SS burst 300. The SSB block 600 includes four OFDM symbols, numbered in increasing order from 0 to 3 within the SS block. The SS block 600 may provide various synchronization and control signals. In this example, the time-frequency resources (e.g., REs or RBs) of SS block 600 may be allocated to carry a PSS 602, an SSS 604, and a PBCH 606. Some resources of the SS block may be allocated to a demodulation reference signal (DMRS) associated with the PBCH. For example, some REs of the symbols where the PBCH 606 is located may be allocated to the associated DMRS 610 or the like. In some aspects of the disclosure, the PBCH 606 spans a wider bandwidth (PBCH BW) than that of the PSS and/or SSS. In one example, the PBCH may have a bandwidth of 240 tones (e.g., subcarriers 0, 1, . . . 239), and the PSS/SSS may have a bandwidth of 127 tones (e.g., subcarriers 56, 57, . . . 182). In another example, the PBCH bandwidth may be twice as wide as the PSS/SSS bandwidth.

In 5G NR, PBCH channel estimation and demodulation may be performed using the PSS/SSS and/or DMRS. The PSS and SSS are transmitted within the same SS block 600 as the PBCH and multiplexed in the time domain with the PBCH symbols. The DMRS is transmitted within the same symbol as the PBCH and multiplexed in the frequency domain. In this example, the PBCH 606 occupies the second and fourth symbols, the PSS 602 occupies the first symbol, and the SSS 604 occupies the third symbol. This particular SS block 600 configuration is merely one example. In other aspects of the disclosure, the PSS, SSS, and PBCH may be allocated to different REs of an SS block in other examples. That is, the sequence of PBCH, PSS, and SSS may be different than this example, and further, may appear different in the frequency domain.

When the scheduling entity transmits PSS and SSS in the same SS block as the PBCH, the receiving device may demodulate the PBCH based on, at least partly, the PSS and/or SSS. The PSS/SSS may be used as a reference signal for channel estimation and demodulation of the PBCH. However, additional dedicated DMRS may be needed in some situations, for example, when the bandwidth of the PSS/SSS is less than the bandwidth of the PBCH. In this case, a dedicated DMRS may be used to provide at least channel estimation for the REs of the PBCH at the tones where the PSS/SSS is not transmitted. In some aspects of the disclosure, the PSS/SSS may be transmitted from one port (e.g., port P0), while the PBCH may be transmitted from two ports (e.g., one common port P0 with PSS/SSS and one additional port P1). In this case, a dedicated DMRS may be needed to provide channel estimation at least for port P1 transmission.

In the example described in relation to FIG. 6, because the PSS and SSS do not use all the available bandwidth within the SS block 600, some or all of the unused/unallocated resources 612 (e.g., REs) may be used for carrying other information or supplemental channels. Some non-limiting examples of supplemental channels are a tertiary sync signal (TSS) for signaling an SS block time index, a beam reference signal (BRS) for beam refinement, a wake-up radio signal or the like to support UE power savings, a common search space PDCCH to signal a scheduling grant of PDSCH resources that carry minimum system information block (MSIB) information (e.g., information indicating a location within a slot or RB where a minimum set of SIBs needed for channel access may be located), a paging channel/signal, etc. In another example, the supplemental channel may be a supplemental PBCH. In one particular example, the scheduling entity may reduce the Master Information Block (MIB) overhead for signaling a common search space configuration by utilizing the reallocated REs to transmit the MIB information using the supplemental channel, etc.

In some examples, some or all of the available REs may be reallocated for transmitting a supplemental channel or signal. For example, a supplemental channel may be frequency-divisionally multiplexed (FDM) with the SSS, while the portion of the available REs 810 within the same symbol as the PSS may remain unused. That is, the nature of the PSS may be such that its information may be degraded if a supplemental channel is FDM with the PSS.

Figure 7:
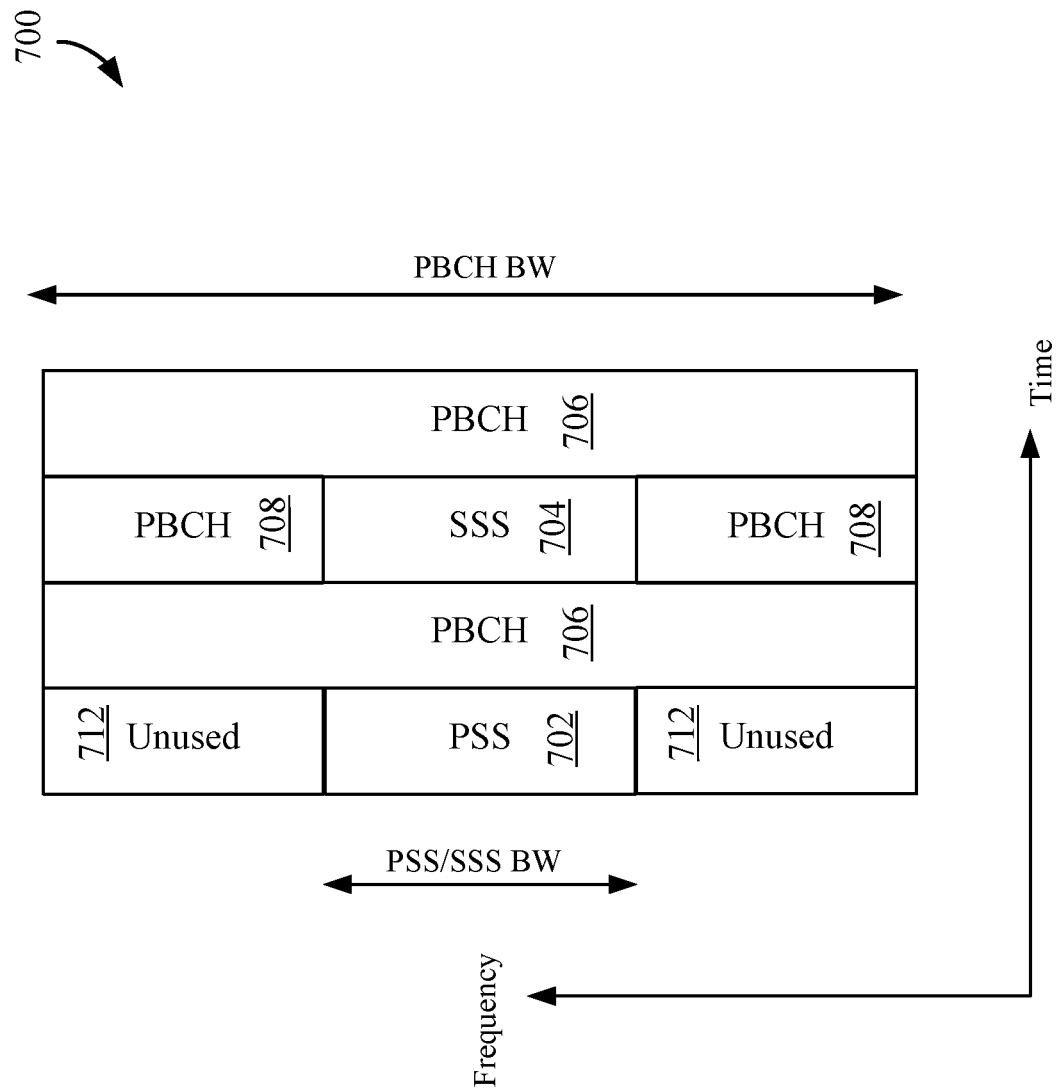
FIG. 7 is a diagram illustrating an exemplary SS block design with a supplemental channel according to some aspects of the disclosure.

FIG. 7 is a diagram illustrating an exemplary SS block 700 according to some aspects of the disclosure. The SS block 700 has a PSS 702, an SSS 704, and a PBCH 706 similar to that of the SS block 600 described above. A DMRS associated with the PBCH 706 is not shown in FIG. 7 for simplicity. In this example, the scheduling entity may allocate unused resources at the third symbol to a supplemental channel (e.g., supplemental PBCH 708) for improving and/or extending link coverage. In this case, the supplemental PBCH 708 and the SSS 704 are multiplexed using FDM at the same symbol location. The supplemental PBCH can improve the link budget and/or coverage of PBCH by transmitting more repetition of coded bits of PBCH payload (e.g., MIB). The supplemental PBCH 708 and PBCH 706 may be jointly encoded such that they are linked from the channel coding perspective. In one example, the coded bits are repeated and mapped into the PBCH. The supplemental PBCH carries additional repetition of the coded bits of the PBCH. For link budget enhancement, the coded bits and their repetitions are further mapped into the supplemental PBCH. For example, the data sequences of the PBCH and supplemental PBCH may be multiplexed and fed to a joint encoder. Jointly encoding of the supplemental PBCH 708 and PBCH 706 may include one or more of channel coding, error correction coding, scrambling, modulation, layer mapping, and precoding to generate OFDM symbols. In some aspects of the disclosure, the supplemental PBCH 708 and PBCH 706 may use the same modulation and channel coding scheme.

In some aspects of the disclosure, the scheduling entity may use the same transmit (Tx) configuration for transmitting the supplemental PBCH 708 and PBCH 706 in the same SS block. Using the same Tx configuration can simplify the receiver design. A Tx configuration refers to a certain combination of transmission schemes. For example, a transmitting device may use the same antenna port configuration, same beamforming configuration, and/or same transmit diversity scheme to transmit the supplemental PBCH and PBCH that are jointly encoded and mapped to different OFDM symbols. In some examples, the transmitting device may use the same numerology (e.g., subcarrier spacing and cyclic prefix) for transmitting the supplemental PBCH and PBCH.

Figure 8:
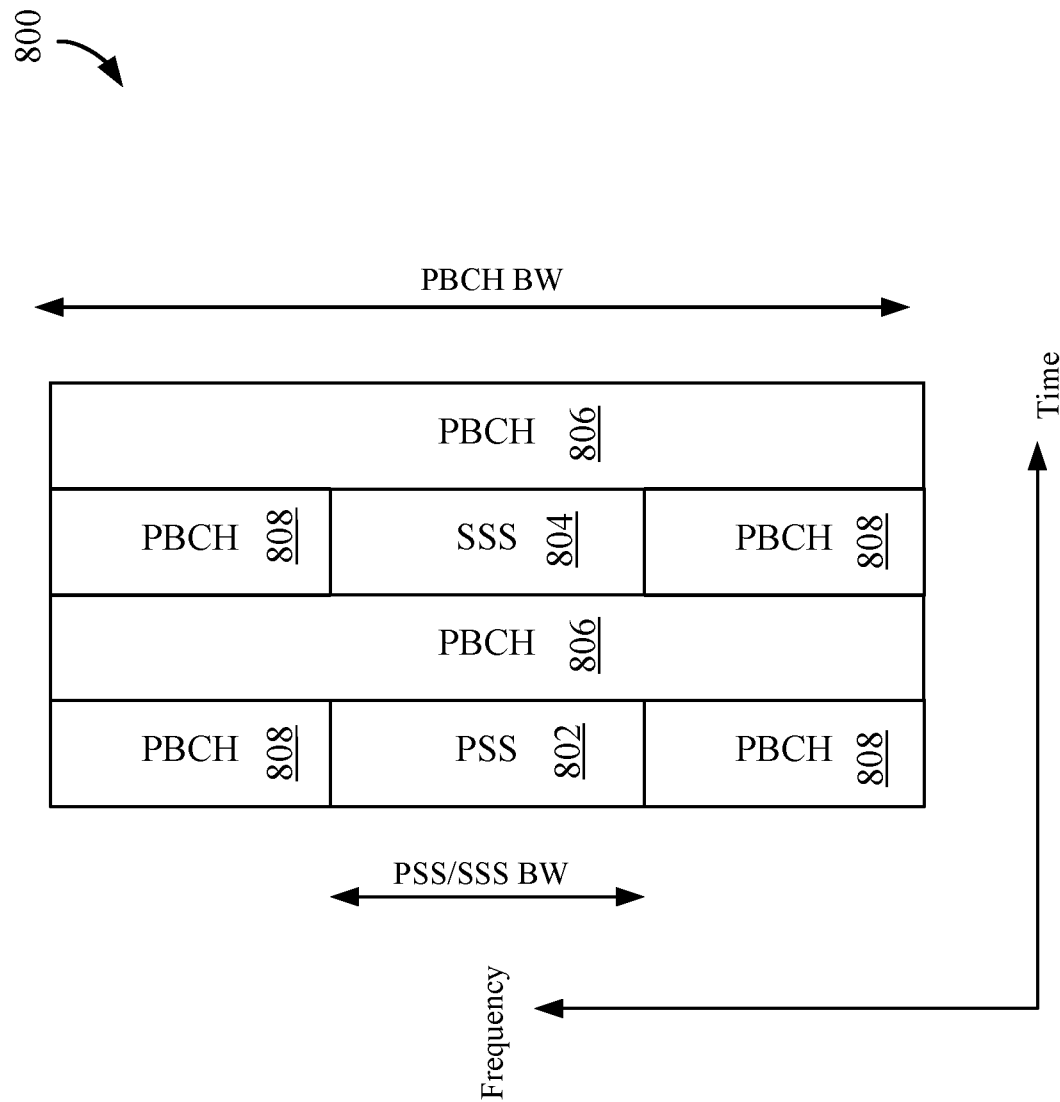
FIG. 8 is a diagram illustrating another exemplary SS block design with a supplemental channel according to some aspects of the disclosure.

FIG. 8 is a diagram illustrating another exemplary SS block 800 according to some aspects of the disclosure. The SS block 800 has a PSS 802, an SSS 804, and a PBCH 806 similar to those of the SS blocks 600 and 700 described above. In this example, the scheduling entity may allocate unused resources at the first and third symbols to a supplemental channel (e.g., a supplemental PBCH 808) for improving and/or extending link coverage. In this case, the supplemental PBCH 808 are frequency multiplexed with the PSS 802 and SSS 804. The scheduling entity may jointly encode the supplemental PBCH 808 and PBCH 806, and use the same modulation and channel coding scheme for their transmission. Moreover, the scheduling entity may use the same Tx configuration for transmitting the supplemental PBCH and the PBCH in the same SS block.

In some aspects of the disclosure, the supplemental signal/channel carried within the available REs may be at least partially utilized to carry DMRS. In other examples, the DMRS carried in the PBCH symbol may also be used as a demodulation reference signal for at least a part of the supplemental signal/channel. When the DMRS associated with PBCH is used for demodulating the supplemental signal/channel, the transmitting device may indicate such case to the UE via MIB, SIB, or RRC signaling. For example, in a scenario where a UE is stationary or slow-moving, channel demodulation based on DMRS in a different symbol, which carries the PBCH, may be adequate for demodulating the supplemental signal/channel. However, in a scenario where a UE is rapidly moving, as in a train or automobile, demodulation of the supplemental signal/channel may benefit from having a DMRS in the same symbol as such supplemental signal/channel. In some examples, such use of the DMRS for PBCH may be preconfigured and no explicit signaling for its use by the supplemental signal/channel may be needed.

Referring back to FIG. 6, in one aspect of the disclosure, some time-frequency resources 612 may remain unused or unallocated. In this example, the available transmit power for these unused or unallocated resources (e.g., REs) may be used to boost or increase the Tx power level of PSS and/or SSS. In one example, the scheduling entity may boost (i.e., increase) the Tx power level of PSS/SSS by 3 dB or any desired value, limited by the available Tx power. That is, the power applied to REs carrying the PSS/SSS may be increased (i.e., boosted) by a predetermined amount (e.g., 3 dB) relative to a nominal level or default value utilized for REs within the same RB or slot. Because a UE may use the PSS/SSS as a DMRS to decode or demodulate the PBCH, the scheduling entity may inform the UE about the power boost if applied. For example, the scheduling entity may use RRC signaling or downlink control information (DCI) to inform the UE about the power boost of the PSS/SSS. When power boost is applied to the PSS/SSS, the scheduling entity needs to consider the power of the PBCH. In one example, when the PBCH is transmitted at its nominal power (i.e., no boost), the PSS/SSS may be boosted by x dB. When the power of PBCH is already increased by y dB, the transmitting device may boost the power of PSS/SSS by x+y dB such that the power difference between the PBCH and PSS/SSS may be maintained. The scheduling entity may indicate the boosted PSS and/or SSS via system information (e.g., remaining minimum system information (RMSI) or Other System Information (OSI)) or radio resource control (RRC) signaling.

Figure 9:
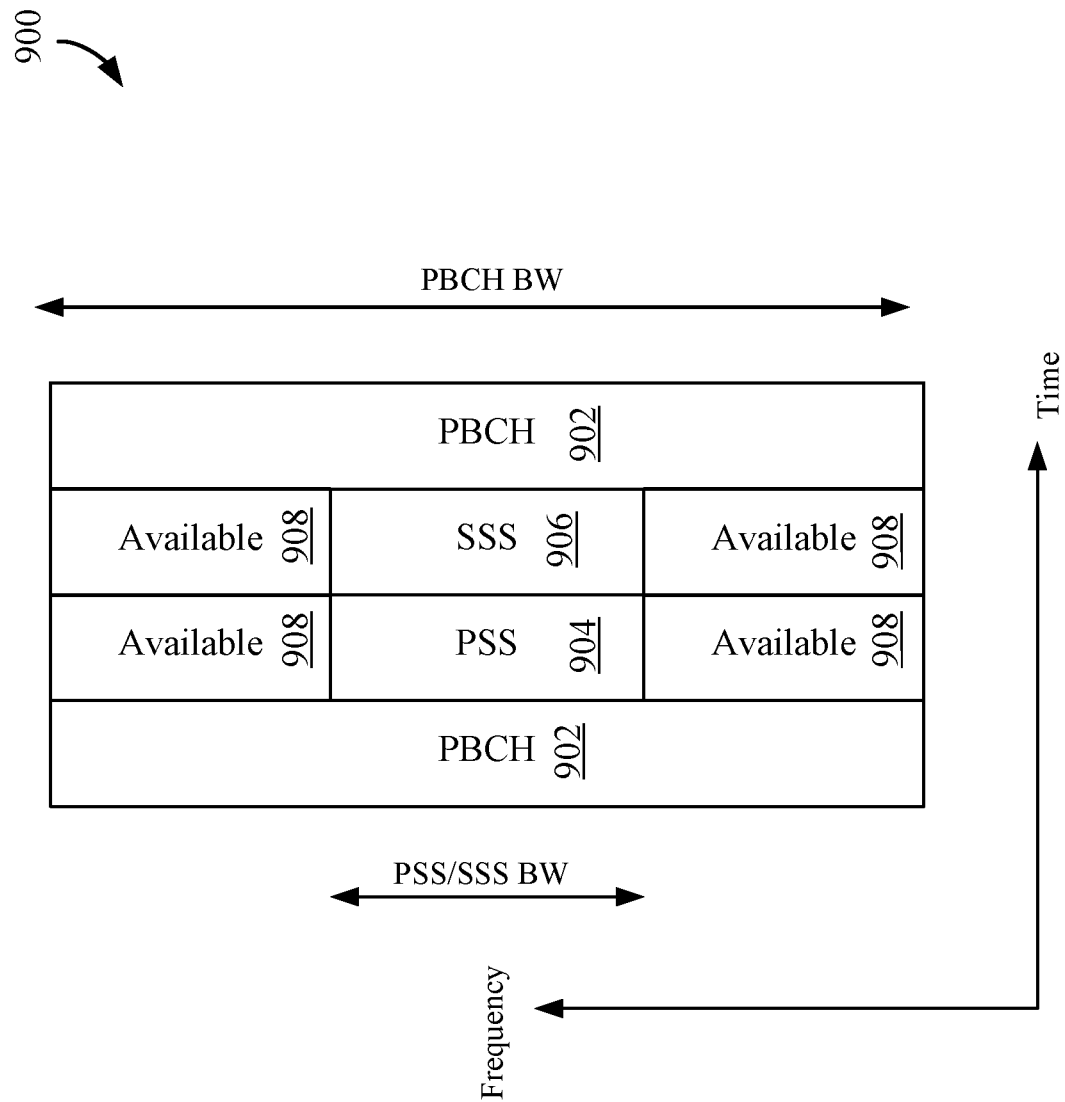
FIG. 9 is a diagram illustrating an exemplary SS block design with unallocated resources according to some aspects of the disclosure.
Figure 10:
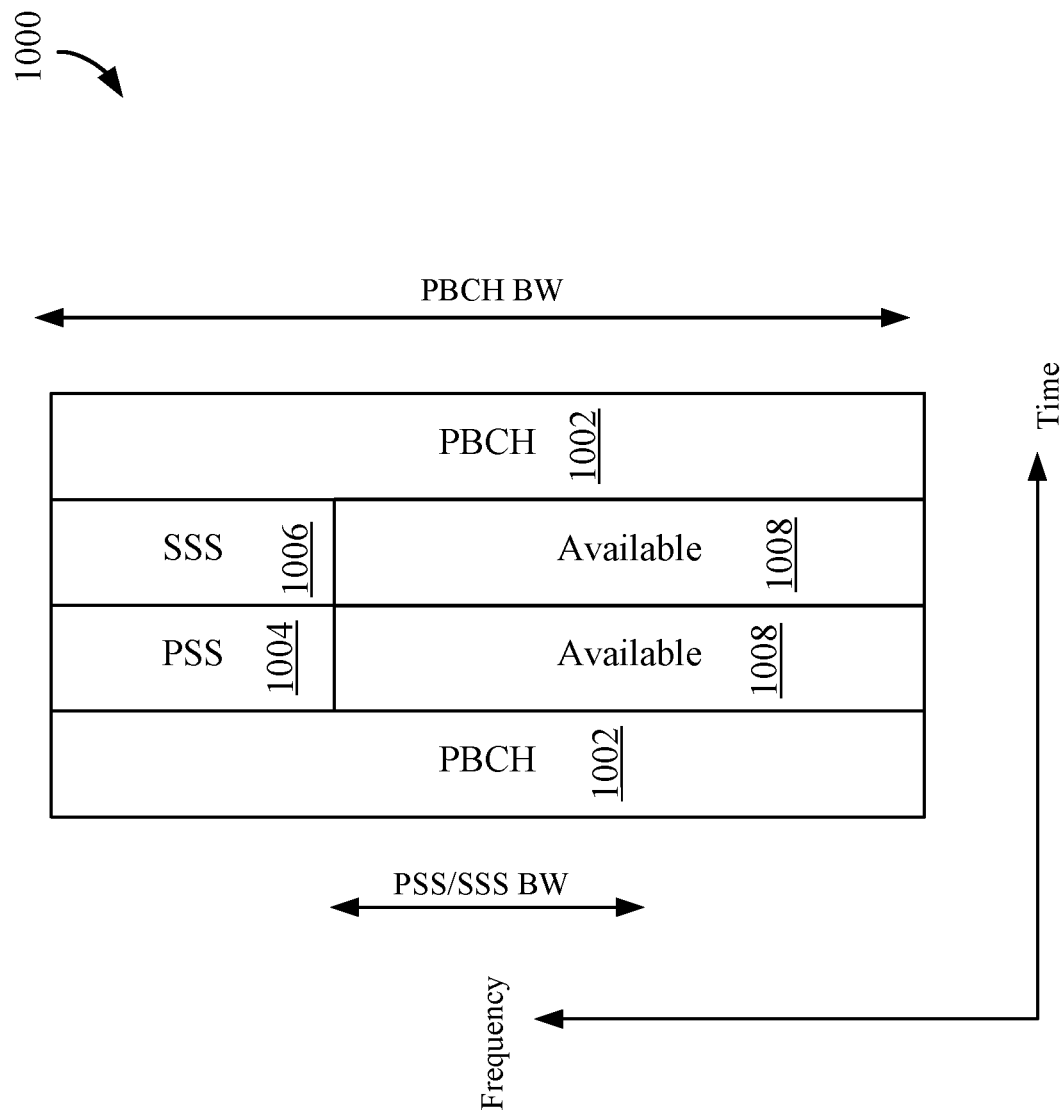
FIG. 10 is a diagram illustrating another exemplary SS block design with unallocated resources according to some aspects of the disclosure.

FIGS. 9 and 10 are diagrams illustrating additional exemplary SS block designs according to some aspects of the disclosure. Referring to FIG. 9, an SS block 900 includes a PBCH 902 in the first and fourth symbols, a PSS 904 in the second symbol, and an SSS 906 in the third symbol. Some time-frequency resources 908 in the second and third symbols are available for reallocation as described above in relation to FIGS. 6-8. Referring to FIG. 10, an SS block 1000 includes a PBCH 1002 in the first and fourth symbols, a PSS 1004 in the second symbol, and an SSS 1006 in the third symbol. Some time-frequency resources 1008 in the second and third symbols are available for reallocation as described above in relation to FIGS. 6-8.

Figure 11:
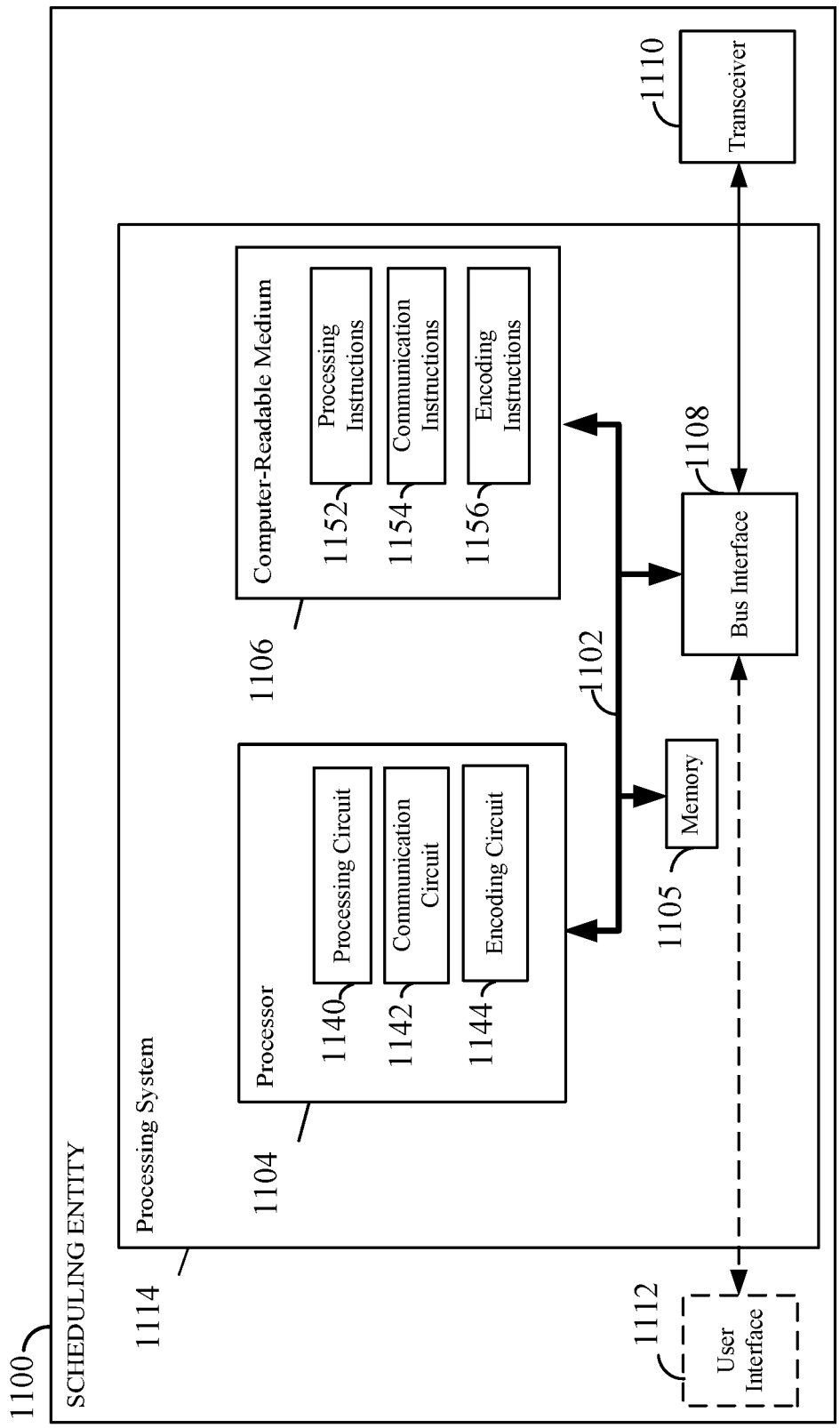
FIG. 11 is a block diagram conceptually illustrating an example of a hardware implementation for a scheduling entity according to some aspects of the disclosure.

FIG. 11 is a block diagram illustrating an example of a hardware implementation for a scheduling entity 1100 employing a processing system 1114. For example, the scheduling entity 1100 may be a user equipment (UE) as illustrated in any one or more of FIGS. 1 and/or 2. In another example, the scheduling entity 1100 may be a base station as illustrated in any one or more of FIGS. 1 and/or 2.

The scheduling entity 1100 may be implemented with a processing system 1114 that includes one or more processors 1104. Examples of processors 1104 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 1100 may be configured to perform any one or more of the functions described herein. That is, the processor 1104, as utilized in a scheduling entity 1100, may be used to implement any one or more of the processes and procedures described in relation to FIGS. 6-10 and 12.

In this example, the processing system 1114 may be implemented with a bus architecture, represented generally by the bus 1102. The bus 1102 may include any number of interconnecting buses and bridges depending on the specific application of the processing system 1114 and the overall design constraints. The bus 1102 communicatively couples together various circuits including one or more processors (represented generally by the processor 1104), a memory 1105, and computer-readable media (represented generally by the computer-readable medium 1106). The bus 1102 may also link various other circuits such as timing sources, peripherals, voltage regulators, and power management circuits, which are well known in the art, and therefore, will not be described any further. A bus interface 1108 provides an interface between the bus 1102 and a transceiver 1110. The transceiver 1110 provides a communication interface or means for communicating with various other apparatus over a transmission medium. Depending upon the nature of the apparatus, a user interface 1112 (e.g., keypad, display, speaker, microphone, joystick) may also be provided. Of course, such a user interface 1112 is optional, and may be omitted in some examples, such as a base station.

In some aspects of the disclosure, the processor 1104 may include circuitry (e.g., a processing circuit 1140, a communication circuit 1142, and an encoding circuit 1144) configured for various functions, including, for example, communication with a scheduled entity using a synchronization signal block. For example, the circuitry may be configured to implement one or more of the functions described in relation to FIG. 12.

The processor 1104 is responsible for managing the bus 1102 and general processing, including the execution of software stored on the computer-readable medium 1106. The software, when executed by the processor 1104, causes the processing system 1114 to perform the various functions described below for any particular apparatus. The computer-readable medium 1106 and the memory 1105 may also be used for storing data that is manipulated by the processor 1104 when executing software.

One or more processors 1104 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1106. The computer-readable medium 1106 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1106 may reside in the processing system 1114, external to the processing system 1114, or distributed across multiple entities including the processing system 1114. The computer-readable medium 1106 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 1106 may include software (e.g., processing instructions 1152, communication instructions 1154, and encoding instructions 1156) configured for various functions, including, for example, communication with a scheduled entity using an SS block. For example, the software may be configured to implement one or more of the functions described in relation to FIG. 12.

Figure 12:
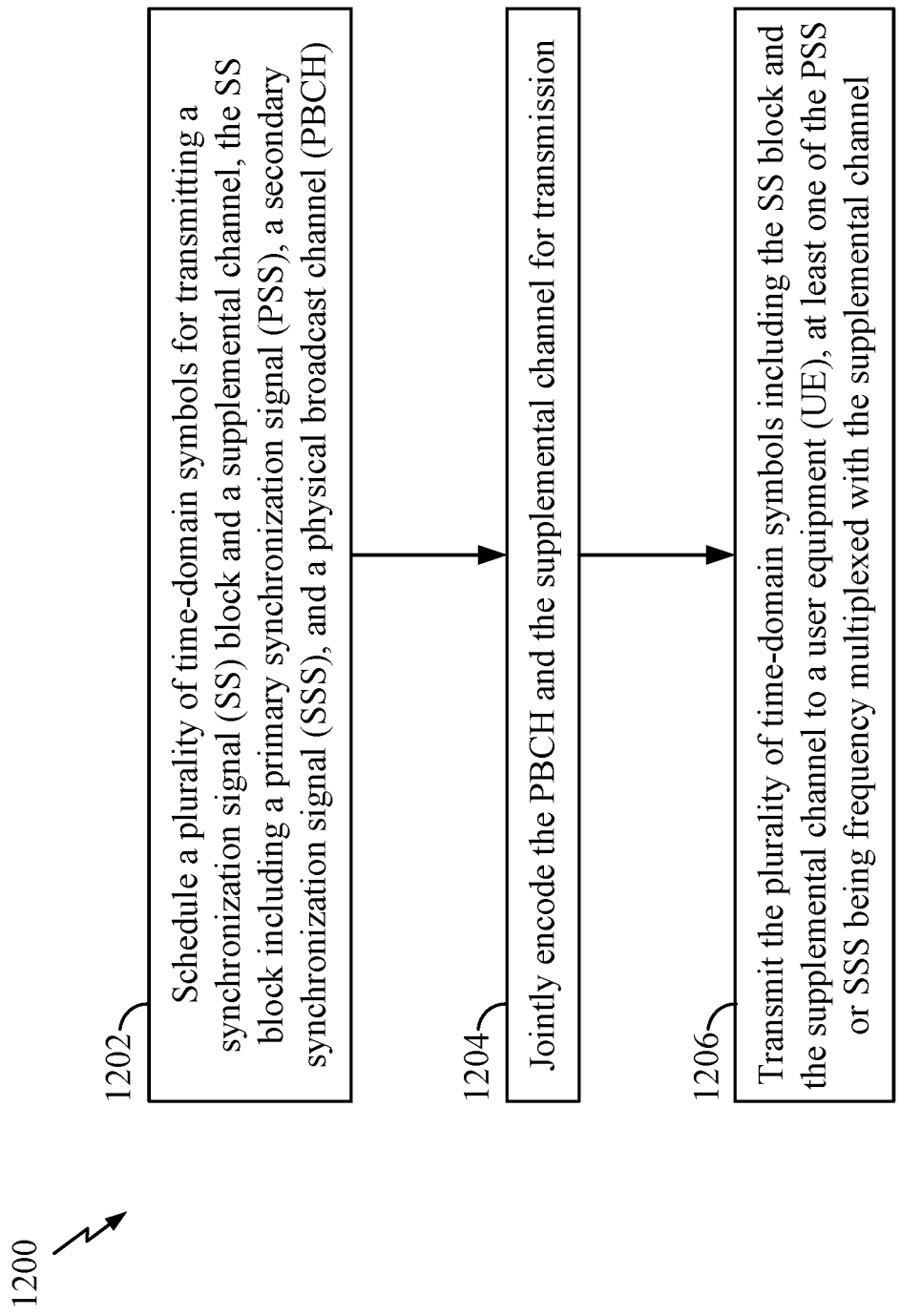
FIG. 12 is a flow chart illustrating an exemplary process for wireless communication using an SS block according to some aspects of the present disclosure.

FIG. 12 is a flow chart illustrating an exemplary process 1200 for wireless communication using a synchronization signal (SS) block according to some aspects of the present disclosure. As described below, some or all illustrated features may be omitted in a particular implementation within the scope of the present disclosure, and some illustrated features may not be required for implementation of all embodiments. In some examples, the process 1200 may be carried out by the scheduling entity 1100 illustrated in FIG. 11. In some examples, the process 1200 may be carried out by any suitable apparatus or means for carrying out the functions or algorithm described below.

At block 1202, with reference to FIG. 11, the scheduling entity 1100 uses the communication circuit 1142 to schedule a plurality of time-domain symbols for transmitting an SS block and a supplemental channel. For example, the SS block includes a primary synchronization signal (PSS), a secondary synchronization signal (SSS), and a physical broadcast channel (PBCH), similar to the SS blocks illustrated in FIGS. 6-10.

At block 1204, the scheduling entity uses the encoding circuit 1144 to jointly encode the PBCH and the supplemental channel for transmission. For example, the encoding circuit 1144 may be configured to multiplex the data sequences of the PBCH and supplemental channel and feed the multiplexed sequences to a joint encoder.

At block 1206, the scheduling entity uses the transceiver 1110 to transmit the plurality of time-domain symbols including the SS block and the supplemental channel to a UE or scheduled entity. In some examples, at least one of the PSS or SSS is frequency multiplexed with the supplemental channel. In one example, the supplemental channel is a supplemental PBCH that is frequency multiplexed with the PSS and/or SSS in the respective symbol. Using this process 1200, the scheduling entity may utilize unallocated resources of an SS block to transmit a supplemental signal/channel. Thus, communication efficient may be increased.

In some aspects of the disclosure, it is also contemplated that the scheduling entity may boost the Tx power of the PSS and/or SSS when some resources in the same symbol for transmitting the PSS/SSS are not used.

Figure 13:
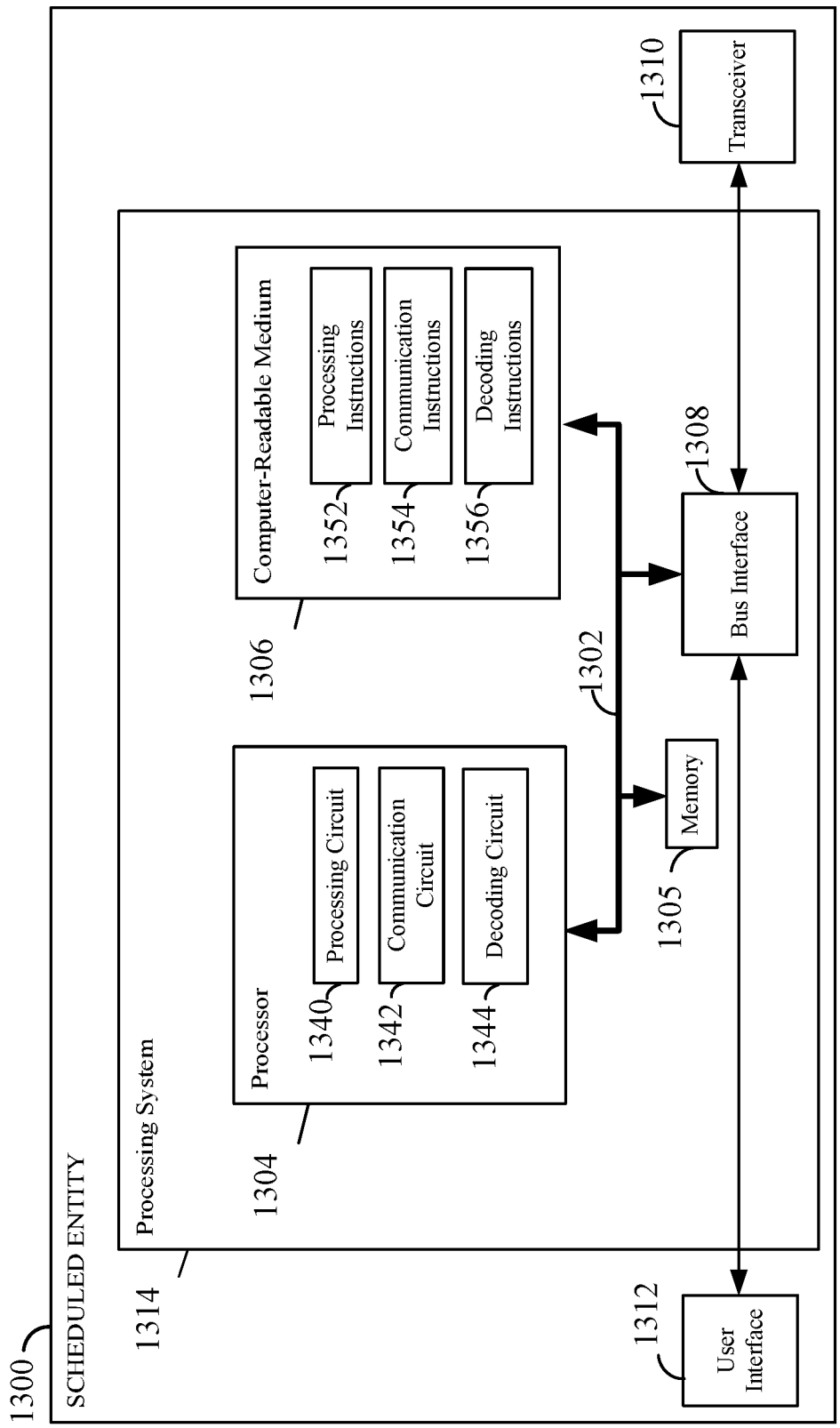
FIG. 13 is a block diagram conceptually illustrating an example of a hardware implementation for a scheduled entity according to some aspects of the disclosure.

FIG. 13 is a conceptual diagram illustrating an example of a hardware implementation for an exemplary scheduled entity 1300 employing a processing system 1314. In accordance with various aspects of the disclosure, an element, or any portion of an element, or any combination of elements may be implemented with a processing system 1314 that includes one or more processors 1304. For example, the scheduled entity 1300 may be a user equipment (UE) as illustrated in any one or more of FIGS. 1 and/or 2.

The processing system 1314 may be substantially the same as the processing system 1114 illustrated in FIG. 11, including a bus interface 1308, a bus 1302, memory 1305, a processor 1304, and a computer-readable medium 1306.

Furthermore, the scheduled entity 1300 may include a user interface 1312 and a transceiver 1310 substantially similar to those described above in FIG. 11. That is, the processor 1304, as utilized in a scheduled entity 1300, may be used to implement any one or more of the processes described below and illustrated in FIG. 13.

In some aspects of the disclosure, the processor 1304 may include circuitry (e.g., a processing circuit 1340, a communication circuit 1342, and a decoding circuit 1344) configured for various functions, including, for example, receiving and decoding SS block in wireless communication. For example, the circuitry may be configured to implement one or more of the functions described below in relation to FIG. 14. In one or more examples, the computer-readable storage medium 1306 may include software (e.g., processing instructions 1352, communication instructions 1354, and decoding instructions 1356) configured for various functions, including, for example, receiving and decoding SS block in wireless communication. For example, the software may be configured to implement one or more of the functions described in relation to FIG. 14.

FIG. 14 is a flow chart illustrating another exemplary process 1400 for wireless communication using a synchronization signal (SS) block according to some aspects of the present disclosure. As described below, some or all illustrated features may be omitted in a particular implementation within the scope of the present disclosure, and some illustrated features may not be required for implementation of all embodiments. In some examples, the process 1400 may be carried out by the schedule entity 1300 illustrated in FIG. 13. In some examples, the process 1400 may be carried out by any suitable apparatus or means for carrying out the functions or algorithm described below.

At block 1402, with reference to FIG. 13, the scheduled entity 1300 uses the communication circuit 1342 and transceiver 1310 to receive a plurality of time-domain symbols including an SS block and a supplemental channel. The SS block includes a PSS, an SSS, and a PBCH, and at least one of the PSS or SSS being frequency multiplexed with the supplemental channel. In some examples, the SS block may be any of the SS blocks described in relation to FIGS. 6-10.

At block 1404, the scheduled entity 1300 uses the decoding circuit 1344 to decode the plurality of time-domain symbols to recover the supplemental channel, PSS, SSS, and PBCH that is jointly encoded with the supplemental channel. The scheduled entity performs joint decoding of the PBCH and supplemental PBCH. An exemplary decoding process may include one or more of symbols reading, layer demapping and deprecoding, demodulation, descrambling, and codeword decoding. In some examples, the scheduled entity may use DMRS associated with the PBCH to demodulate the supplemental channel. In some examples, the supplemental channel is a supplemental PBCH. In some examples, the scheduled entity may use the PSS/SSS as a demodulation reference signal for demodulating the PBCH.

In one configuration, the apparatus 1100 and/or 1300 for wireless communication includes various means for transmitting and/or receiving an SS block and supplemental channel(s). In one aspect, the aforementioned means may be the processor(s) 1104/1304 shown in FIGS. 11/13 configured to perform the functions recited by the aforementioned means. In another aspect, the aforementioned means may be a circuit or any apparatus configured to perform the functions recited by the aforementioned means.

Of course, in the above examples, the circuitry included in the processor 1104/1304 is merely provided as an example, and other means for carrying out the described functions may be included within various aspects of the present disclosure, including but not limited to the instructions stored in the computer-readable storage medium 1106/1306, or any other suitable apparatus or means described in any one of the FIGS. 1 and/or 2, and utilizing, for example, the processes and/or algorithms described herein in relation to FIGS. 12 and/or 14.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-14 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-14 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication, comprising:
   scheduling a plurality of time-domain symbols for transmitting a synchronization signal (SS) block and a supplemental channel, the SS block comprising a primary synchronization signal (PSS), a secondary synchronization signal (SSS), and a physical broadcast channel (PBCH);
   jointly encoding the PBCH and the supplemental channel for transmission such that the supplemental channel comprises coded bits of the PBCH; and
   transmitting the plurality of time-domain symbols comprising the SS block and the supplemental channel to a user equipment (UE), the SSS being frequency multiplexed with the supplemental channel, and the SSS being time multiplexed with the PBCH.

2. The method of claim 1, wherein the supplemental channel comprises a supplemental PBCH.

3. The method of claim 1, wherein the supplemental channel and the SSS are frequency multiplexed in a same time-domain symbol.

4. The method of claim 3, wherein the supplemental channel and the PSS are frequency multiplexed in a same time-domain symbol.

5. The method of claim 1, wherein the transmitting comprises:
   transmitting the PBCH spanning a first bandwidth; and
   transmitting the PSS and SSS spanning a second bandwidth that is narrower than the first bandwidth.

6. The method of claim 5, wherein the transmitting comprises:
   transmitting at least one of the PSS or SSS at a boosted power level that is higher than a nominal power level.

7. The method of claim 6, further comprising:
   indicating to the UE the boosted power level of at least one of the PSS or SSS with respect to the nominal power level.

8. The method of claim 1, wherein the supplemental channel comprises at least one of:
   a tertiary sync signal (TSS) for signaling an SS block time index;
   a beam reference signal (BRS) for facilitating beam refinement;
   a wake-up radio signal; or
   a paging signal.

9. The method of claim 1, wherein the transmitting comprises transmitting the supplemental channel and the PBCH utilizing a same transmit configuration.

10. The method of claim 9, wherein the transmit configuration comprises at least one of an antenna port configuration, a beamforming configuration, a transmit diversity scheme, or a numerology.

11. The method of claim 1, further comprising utilizing a demodulation reference signal (DMRS) of the PBCH as a reference signal for the supplemental channel.

12. The method of claim 11, further comprising indicating to the UE to utilize the DMRS of the PBCH as the reference signal for the supplemental channel.

13. A method of wireless communication, comprising:
   receiving a plurality of time-domain symbols comprising a synchronization signal (SS) block and a supplemental channel;
   the SS block comprising a primary synchronization signal (PSS), a secondary synchronization signal (SSS), and a physical broadcast channel (PBCH), the SSS being frequency multiplexed with the supplemental channel, and the SSS being time multiplexed with the PBCH; and
   decoding the plurality of time-domain symbols to recover the supplemental channel, PSS, SSS, and PBCH that is jointly encoded with the supplemental channel that comprises coded bits of the PBCH.

14. The method of claim 13, wherein the supplemental channel comprises a supplemental PBCH.

15. The method of claim 14, wherein the decoding comprises:
   jointly decoding the PBCH and the supplemental PBCH.

16. The method of claim 13, wherein the supplemental channel and the SSS are frequency multiplexed in a same time-domain symbol.

17. The method of claim 16, wherein the supplemental channel and the PSS are frequency multiplexed in a same time-domain symbol.

18. The method of claim 13, wherein the receiving comprises:
   receiving the PBCH spanning a first bandwidth; and
   receiving the PSS and SSS spanning a second bandwidth that is narrower than the first bandwidth.

19. The method of claim 13, wherein the receiving comprises:
   receiving at least one of the PSS or SSS at a boosted power level that is higher than a nominal power level.

20. The method of claim 19, further comprising:
   receiving an indication from a scheduling entity, indicating the boosted power level of at least one of the PSS or SSS with respect to the nominal power level.

21. The method of claim 13, wherein the supplemental channel comprises at least one of:
   a tertiary sync signal (TSS) for signaling an SS block time index;

a beam reference signal (BRS) for facilitating beam refinement;
a wake-up radio signal;
or
a paging signal.

22. The method of claim 13, further comprising:
receiving an indication to utilize a demodulation reference signal (DMRS) of the PBCH as a reference signal for the supplemental channel.

23. The method of claim 13, wherein the decoding comprises:
demodulating the supplemental channel using a PBCH demodulation reference signal (DMRS).

24. A scheduling entity for wireless communication, comprising:
a communication interface;
a memory; and
a processor operatively coupled with the communication interface and the memory, wherein the processor and the memory are configured to:
schedule a plurality of time-domain symbols for transmitting a synchronization signal (SS) block and a supplemental channel, the SS block comprising a primary synchronization signal (PSS), a secondary synchronization signal (SSS), and a physical broadcast channel (PBCH);
jointly encode the PBCH and the supplemental channel for transmission such that the supplemental channel comprises coded bits of the PBCH; and
transmit the plurality of time-domain symbols comprising the SS block and the supplemental channel to a user equipment (UE), the SSS being frequency multiplexed with the supplemental channel, and the SSS being time multiplexed with the PBCH.

25. The scheduling entity of claim 24, wherein the supplemental channel comprises a supplemental PBCH.

26. The scheduling entity of claim 24, wherein the supplemental channel and the SSS are frequency multiplexed in a same time-domain symbol.

27. The scheduling entity of claim 26, wherein the supplemental channel and the PSS are frequency multiplexed in a same time-domain symbol.

28. The scheduling entity of claim 24, wherein the processor and the memory are further configured to:
transmit the PBCH spanning a first bandwidth; and
transmit the PSS and SSS spanning a second bandwidth that is narrower than the first bandwidth.

29. The scheduling entity of claim 28, wherein the processor and the memory are further configured to:
transmit the PSS and/or SSS at a boosted power level that is higher than a nominal power level.

30. The scheduling entity of claim 29, wherein the processor and the memory are further configured to:
indicate to the UE the boosted transmit power level of the PSS and/or SSS with respect to the nominal power level.

31. The scheduling entity of claim 24, wherein the supplemental channel comprises at least one of:
a tertiary sync signal (TSS) for signaling an SS block time index;
a beam reference signal (BRS) for facilitating beam refinement;
a wake-up radio signal;
or
a paging signal.

32. The scheduling entity of claim 24, wherein the processor and the memory are further configured to:
transmit the supplemental channel and the PBCH utilizing a same transmit configuration.

33. The scheduling entity of claim 32, wherein the transmit configuration comprises at least one of an antenna port configuration, a beamforming configuration, a transmit diversity scheme, or a numerology.

34. The scheduling entity of claim 24, wherein the processor and the memory are further configured to:
utilize a demodulation reference signal (DMRS) of the PBCH as a reference signal for the supplemental channel.

35. The scheduling entity of claim 34, wherein the processor and the memory are further configured to:
indicate to the UE to utilize the DMRS of the PBCH as the reference signal for the supplemental channel.

36. A user equipment (UE) for wireless communication, comprising:
a communication interface;
a memory; and
a processor operatively coupled with the communication interface and the memory, wherein the processor and the memory are configured to:
receive a plurality of time-domain symbols comprising a synchronization signal (SS) block and a supplemental channel;
the SS block comprising a primary synchronization signal (PSS), a secondary synchronization signal (SSS), and a physical broadcast channel (PBCH), the SSS being frequency multiplexed with the supplemental channel, and the SSS being time multiplexed with the PBCH; and
decode the plurality of time-domain symbols to recover the supplemental channel, PSS, SSS, and PBCH that is jointly encoded with the supplemental channel that comprises coded bits of the PBCH.

37. The UE of claim 36, wherein the supplemental channel comprises a supplemental PBCH.

38. The UE of claim 37, wherein the processor and the memory are further configured to:
jointly decode the PBCH and the supplemental PBCH.

39. The UE of claim 36, wherein the supplemental channel and the SSS are frequency multiplexed in a same time-domain symbol.

40. The UE of claim 39, wherein the supplemental channel and the PSS are frequency multiplexed in a same time-domain symbol.

41. The UE of claim 36, wherein the processor and the memory are further configured to:
receive the PBCH spanning a first bandwidth; and
receive the PSS and SSS spanning a second bandwidth that is narrower than the first bandwidth.

42. The UE of claim 36, wherein the processor and the memory are further configured to:
receive the PSS and SSS at a boosted power level that is higher than a nominal power level.

43. The UE of claim 42, wherein the processor and the memory are further configured to:
receive an indication from a scheduling entity, indicating that a transmit power of at least one of the PSS or SSS is increased from the nominal power level to the boosted power level.

44. The UE of claim 36, wherein the supplemental channel comprises at least one of:
a tertiary sync signal (TSS) for signaling an SS block time index;

a beam reference signal (BRS) for facilitating beam refinement;
a wake-up radio signal; or
a paging signal.

45. The UE of claim 36, wherein the processor and the memory are further configured to:
receive an indication to utilize a demodulation reference signal (DMRS) of the PBCH as a reference signal for the supplemental channel.

46. The UE of claim 36, wherein the processor and the memory are further configured to:
demodulate the supplemental channel using a PBCH demodulation reference signal (DMRS).

\* \* \* \* \*